United States Patent Office 3,806,350
Patented Apr. 23, 1974

3,806,350
FIBER-REINFORCED COLLAGEN COMPOSITION AND PROCESS FOR PREPARING SAME
Joachim Kuhn, and Peter Bohm, Hohensachsen, Germany, assignors to Carl Freudenberg, Patentableilung, Weinheim, Germany
No Drawing. Continuation-in-part of abandoned application Ser. No. 55,557, July 16, 1970. This application Dec. 29, 1971, Ser. No. 213,832
Claims priority, application, Germany, July 28, 1969, P 19 38 188.5
Int. Cl. C08h 7/00
U.S. Cl. 106—124                              8 Claims

ABSTRACT OF THE DISCLOSURE

Aqueous swollen collagen of dough-like consistency is raised in pH whereupon it de-swells or shrinks. Fiber reinforcement can then be stirred into the aqueous phase. Upon re-acidfication, the collagen again swells with the fiber re-inforcement distributed substantially uniformly therethrough. If desired, a dispersion of an ester of polyacrylic acid or polyvinylidene chloride can be incorporated in the mass, preferably before re-swelling. The product can then be shaped in known manner, as by extrusion, and de-watered as by coagulation and/or drying.

---

This is a continuation-in-part of application Ser. No. 55,557, filed July 16, 1970, now abandoned.

The present invention relates to distributing a fiber-reinforcement uniformly through collagen.

It is known that animal hides comprise collagen which in turn comprises skin fibers. The fibers in turn comprise smaller units known as fibrils, e.g. as described in British Pat. 991,183 and in the article, "Ultrastructure of Protein Fibers" in the publication "Collagen," Academic Press, New York (1963), pp. 19 to 37. The assumption stated in British Pat. 991,183 that the fibrils are surrounded by an elastic membrane and that a fiber is the sum of all of the fibrils held together by the membrane is no longer sustained today, but it is generally recognized that a collagen skin is constructed of skin fibers and fibrils.

In addition to the tanning of natural hides in the manufacture of leather, collagen is also involved in the manufacture of synthetic sausage casings. For this purpose the hide is first soaked and mechanically ground so that the fibers are separated from one another. This also results in a destruction of the fibers, to some extent, with the release of the fibrils. The softened mass of hide fibers is then extruded through annular slits in the form of tubing. Such tubing has been used for decades as synthetic sausage casings under the designation "Naturin." The manufacturing processes entailed are disclosed in German Pats. 650,526, 650,887, 659,490, 664,414, 669,-128, 670,552, 671,490, 671,953, 672,035 and 672,036. The grinding, however, can also be performed to such an extent that the result is only a suspension of fibrils, which, according to German Pat. 875,389 and U.S. Pat. 2,039,-262, can be made into high-strength filaments and strings of collagen, which in turn can be used in surgery or in the manufacture of musical instrument strings.

Collagen can also be made by a freezing process into foams which are of medical interest, as explained in "Journal of the American Leather Chemist Association" (1964), pages 587 sqq.

Now, for many purposes it would be desirable to strengthen these collagen compositions by the incorporation of reinforcing fibers. It is known that a fiber-reinforced sheet material has a substantially greater strength than the plain sheet. If, for example, it were desired to strengthen cellulose sheets by the incorporation of fibers, this would involve no particular difficulty, because a thin ester solution of organic cellulose having a low viscosity can be prepared, into which cellulose fibers could then be dispersed according to German Pat. 568,820, for example.

The inorporation of fibers into a collagen mass, however, involves considerable difficulty because, in contrast to ester solutions of cellulose, this mass is very viscous, i.e. dough-like. Artificial fibers can, of course, be stirred into the collagen composition that is obtainable according to the patents cited above. However, they always clump together, so that the distribution of the fibers within the collagen composition is extremely irregular.

It is accordingly an object of the invention to provide a simple procedure for distributing a fibrous reinforcement substantially uniformly through collagen.

This and other objects and advantages are realized in accordance with the present invention wherein a water-swollen collagen mass is de-swollen, i.e. dehydrated or shrunk, and a fiber reinforcement is then added. The collagen may thereafter be re-swollen and the fibers will remain distributed therethrough, although for some purposes such re-swelling is not necessary.

A collagen mass prepared according to German Pat. 671,953 or any other of the above-named patents contains only about 8 to 12% solid matter. The rest, i.e., about 88 to 92%, is water. Thus, the ratio of water to collagen may range from about 92:8 to 88:12, i.e. about 12 to 7:1. The water is bound and distributed uniformly within the mass, chemically and physically, so that the swollen, i.e., hydrated, mass is in a jelly-like state of dough-like consistency. As stated above, it is impossible to stir short fibers, and therefore certainly not longer reinforcements like staple fibers, uniformly into a jelly of this kind.

Now, according to the invention, a shrinking is first effected. This can be accomplished simply by raising the pH of the collagen mass, which is about 3, to about 5, whereupon there is formed an aqueous phase having dispersed therein a network of shrunken, i.e., dehydrated or de-swollen, collagen fibers. It is then that the reinforcing fibers are stirred in, resulting in a uniform suspension of shrunken fibers and the added fibers within the aqueous medium. This mass is then drained on a sieve until a mass is produced having a total solids weight of approximately 25%. Then the pH is restored to about 3, resulting in swelling, i.e hydration. The re-swollen hide fiber mass is then uniformly reinforced with the added fibers.

The added reinforcing fibers may be of substantially any type, e.g. nylon, polyester, polyolefin, acrylic or cellulosic, e.g. rayon, acetate or cotton, jute, sisal, hemp, and the like. Wool, glass fibers, metallic fibers, and the like may also be employed although they are less preferred for reasons of cost or properties. The reinforcing fiber may range in denier from as little as 1 or less to 50 or more, depending upon the end use although normal textile deniers of from about 3 to 25 are preferred for most purposes. Their length may be susbtantially continuous, e.g. several meters or more in length, although preferably they are of normal staple lengths and especially about 5 to 30 mm. The amount of fiber added may range from about 0.1 to 10 times the weight of the water-free collagen material. Outside these limits the product, has too much the character of only one of the components.

It has proven desirable for some purposes to include in the product an ester of polyacrylic acid or a polyvinyl chloride, e.g. polyvinyl chloride, polyvinylidene chloride, and the like. Advantageously, these polymers are added, in the form of dispersions or latices, to the collagen-fiber composition before re-swelling (if undertaken) is complete; preferably before re-swelling is initiated. Alternatively, however, they can be added during the re-swelling or even before de-swelling. The amount added may range from about 1 to 10% by weight of the fiber plus collagen, preferably approximately 2%. An especially suitable additive is the 40% dispersion of polyacrylic ester in water sold by BASF under the trademark Acronal, the material being stirred into the de-swollen slurry of collagen in water.

The invention will be further described in the following illustrative examples wherein all parts are by weight unless otherwise stated.

EXAMPLE 1

A homogeneous water-swollen collagen mass at pH 3.0 and having a solids content of 13%, is diluted to a solids content of 3%, and at the same time the pH is increased to 5.0 by the addition of soda lye. An aqueous suspension of collagen fibers is obtained. To 100 kg. of this suspension 9 kg. of short nylon-6 fibers (10 mm., 1.3 d-tex) are added in a sinusoidal mixer. After a mixing period of 1 minute, a uniform mixture of collagen fibers and nylon fibers is obtained. The fibrous mass is drained on a sieve until a total solids content of approximately 25% is achieved. If the pH is then raised to 3.0 while stirring as the viscosity rises, a moldable composition is obtained which contains about 6% collagen and 18% nylon fibers in substantially uniform distribution.

EXAMPLE 2

100 kg. of a swollen collagen mass (pH 3.0, 13% solids) is mixed in a kneader with 10 kg. of the collagen-nylon fiber mixture obtained according to Example 1. A moldable composition is obtained, which contains about 13% of nylon fibers based on the weight of collagen.

EXAMPLE 3

The procedure is the same as in Example 1, but the 9 kg. of nylon fibers are a mixture of three kilograms each of fibers 5 mm., 10mm. and 15 mm. long.

EXAMPLE 4

Substantially similar results are achieved substituting for the fibers of Example 3 fibers of 3.3 d-tex.

The products of the foregoing examples may be formed into shaped structures such as films, e.g. sausage casings, by extrusion in the same manner as unreinforced collagen and the water may be removed therefrom as by drying and/or by coagulation of the extrudate by passing the extrudate through a bath of suitable pH or containing certain salts, as described in British Pat. 429,040.

It is noteworthy that the production of fiber-reinforced collagen shaped structures in accordance with the present invention can be performed on existing collagen-handling equipment from the step of adding the reinforcing fibers to the extrusion and hardening, i.e. dewatering.

As noted hereinabove, the fibers may comprise nylon which has reference to linear polyamides of any type including copolymers of one or more dicarboxylic acids such as adipic, sebacic, terephthalic or isophthalic acids and diamines such as hexamethylene diamine and the like, aminocarboxylic acids or their lactams such as caprolactam, and the like, as well as interpolymers thereof. Polyester has reference to linear polyesters of the same dicarboxylic acids noted hereinabove, for example, with glycols such as one or more of ethylene glycol, butylene glycol, ethylene diglycol, and the like. Polyolefins has reference principally to polyethylene, polypropylene and polybutylene. Suitable acrylic fibers comprise copolymers of acrylonitrile with methyl acrylate, ethyl acrylate, and the like. Other fibers may be similarly employed since they perform a physical rather than a chemical function. The fiber length may vary but it is preferably at least about 10 mm. for maximum reinforcing action.

It will be appreciated that the instant specification and examples are set forth by way of illustration and not limitation, and that various modifications and changes may be made without departing from the spirit and scope of the present invention.

What is claimed is:

1. Process for the manufacture of a moldable collagen material having staple fibers uniformly distributed therethrough from an acid water-swollen collagen mass, comprising de-swelling said mass by increasing the pH to at least about 5 to form a liquid phase and a de-swollen collagen phase, stirring reinforcing staple fibers into said liquid phase in the absence of a tanning agent, whereby such fibrous material is uniformly distributed relative to said collagen material, and subsequently re-acidifying said mixture whereby the collagen re-swells to the original moldable state.

2. The process according to claim 1, wherein said fibrous material comprises at least one of nylon, polyester, polyolefin, acrylic, rayon, cellulose acetate or cotton.

3. The process according to claim 1, wherein said fibrous material comprises staple fibers ranging in length from about 5 to 30 mm.

4. The process according to claim 1, wherein said fibrous material is added in an amount ranging from about 0.1 to 10 times the weight of the water-free collagen material.

5. The process according to claim 1, including the further step of adding to said mass an ester of polyacrylic acid or a polyvinyl chloride in an amount ranging from about 1 to 10% by weight of the water-free collagen material plus fibrous material, said addition being effected prior to re-swelling.

6. The process according to claim 5, wherein said staple fibers are from about 5 to 30 mm. in length, comprise at least one of nylon, polyester, polyolefin, acrylic, rayon, acetate or cotton and are added in an amount ranging from about 0.1 to 10 times the weight of the water-free collagen material.

7. The process according to claim 6, including the further step of forming said fiber-reinforced collagen mass into a predetermined shape, and removing the water therefrom.

8. A sausage casing comprising collagen having distributed substantially uniformly therethrough about 0.1 to 10 times its weight of staple fibers and about 1 to 10% by weight of an ester of polyacrylic acid or polyvinyl chloride by weight of the collagen plus fibrous material, said staple fibers being from about 5 to 30 mm. in length and comprising at least one of nylon, polyester, polyolefin, acrylic, rayon, cellulose acetate or cotton.

References Cited

UNITED STATES PATENTS

| 3,303,038 | 2/1967 | Klevens | 106—155 |
| 3,362,849 | 1/1968 | Tu | 117—140 |
| 3,294,579 | 12/1966 | Tu | 117—140 |

THEORORE MORRIS, Primary Examiner

U.S. Cl. X.R.

138—118; 260—6, 7.5, 8; 106—137, 163, 123, 127